Figures 1, 2:
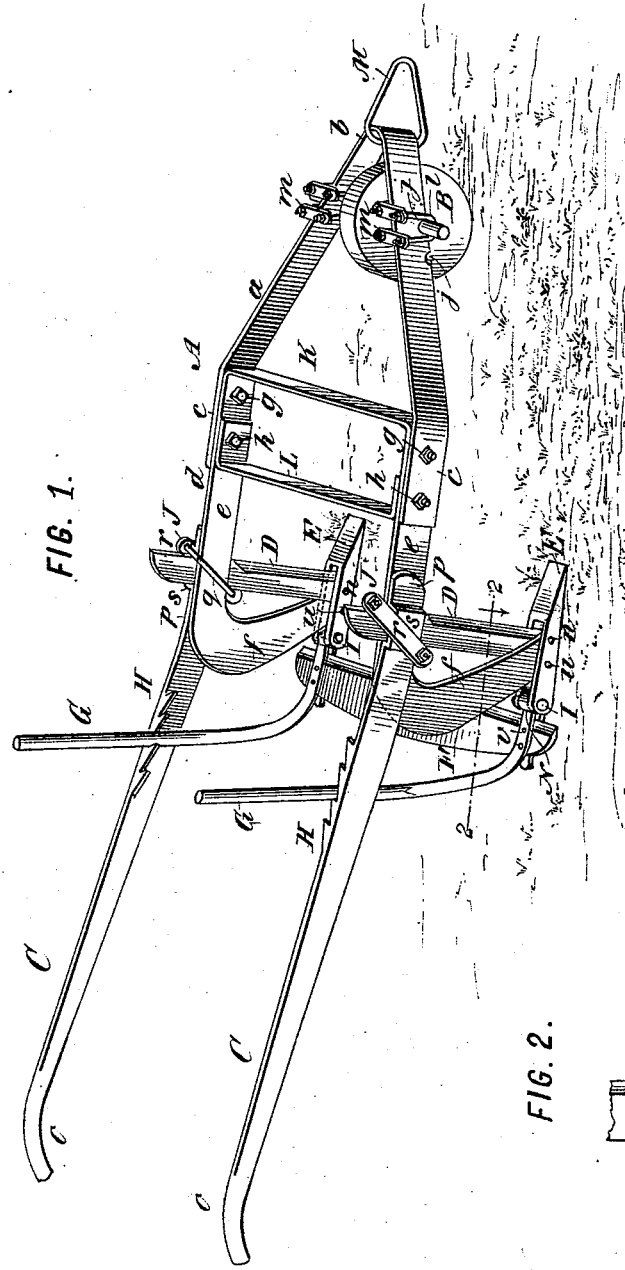

(No Model.)

G. W. CAMERON.
GRUBBER.

No. 542,843. Patented July 16, 1895.

WITNESSES:
Fred White
Thomas F. Wallace

INVENTOR:
George W. Cameron,
By his Attorneys,
Arthur C. Fraser & Co.

UNITED STATES PATENT OFFICE.

GEORGE W. CAMERON, OF GARFIELD, TEXAS, ASSIGNOR TO CAMERON & NORWOOD, OF SAME PLACE.

GRUBBER.

SPECIFICATION forming part of Letters Patent No. 542,843, dated July 16, 1895.

Application filed October 3, 1894. Serial No. 524,776. (No model.)

*To all whom it may concern:*

Be it known that I, GEORGE W. CAMERON, a citizen of the United States, residing at Garfield, in the county of Travis and State of Texas, have invented certain new and useful Improvements in Grubbers and Analogous Implements, of which the following is a specification.

This invention relates to grubbers, grubbing-machines, and analogous implements for agricultural purposes, such as stirring or loosening the soil to plow depth, or rooting by cutting or tearing through the stubs and roots of bushes, brush, or the like.

The invention aims to provide an improved device of this character, which shall be effective and convenient in operation, and simple and durable in construction.

To this end in carrying out the invention in its preferred form, I provide a frame preferably carrying a caster-wheel at front, guiding-handles at rear, vertical cutting knives or shares at its sides, penetrating shares or points at the lower ends of said knives, and a transverse or horizontal knife or share at rear of said points, preferably in substantially the same plane therewith, and adjustably mounted to be tilted or inclined out of the horizontal and adjusting handles for the transverse share.

In the accompanying drawings, which illustrate the preferred form of my invention as applied to a grubbing-machine for cutting stubs and roots, Figure 1 is a perspective view of the machine, and Fig. 2 is a fragmentary transverse section thereof cut on the line 2 2 in Fig. 1 and looking downwardly.

Referring to the drawings, let A indicate the framework as a whole; B, the caster-wheel; C, the guiding-handles; D, the vertical cutters; E, the points; F, the transverse blade or share; G, the adjusting-handles therefor; H, locks for holding said handles; I, pivotal or adjustable connections for the transverse share; J, clamps or fastenings between the handles and frame; K, a cross-brace for the frame; L, another cross-brace therefor, and M a dragging link, eye, or equivalent provision at the front of the machine, by means of which horses or any other source of power may be connected thereto for dragging it through or over the ground.

The frame A may be of any suitable or usual construction, but I prefer to form it at front of an angular bar $a$, bent on itself to form a bend $b$ at front, and having parallel ends $c$, and at rear of a U-shaped bar $d$ bent at right angles on its middle and there constituting the brace K, within and between the ends of the angular bar $a$, extending rearwardly from this part in the form of two substantially-parallel sides $e$, and then bent downwardly and forwardly at its ends in the form of two legs $f$. The pieces $a$ $d$ of the frame are suitably fastened together as by bolts $g$. For securing greater rigidity I prefer to provide the additional cross-brace L, parallel with and at rear of the brace K, the forwardly-bent ends of which brace L are secured to the pieces $a$ and $d$ of the frame and against the inner walls of the sides $e$ of the piece $d$ in any suitable manner as by bolts $h$ passing through all three members of the frame.

The wheel B may be any suitable roller or caster-wheel, suitably disposed to keep the front of the machine from dragging while in use, or to properly support the frame. The wheel shown has an axle $i$, which takes beneath the front of the bar $a$ of the frame, and seats in one or more notches $j$ in the lower edge of this bar, being held in place in the construction shown by U-shaped clamps $l$, the free ends of which rise above the bar $a$, are engaged by plates $m$, and carry nuts on their upper ends by means of which they are drawn up against the axle. By loosening the clamps and moving the wheel backward its axle may be put in the next notch $j$, to adjust the wheel when such adjustment is required.

Any suitable construction of handle or handles may be employed for the machine. The one shown consists of metallic rods having rounded handle ends $o$, flat bodies, and butt-ends $p$, which latter come against the outer faces of the sides $e$ of the frame and are suitably secured thereto. Preferably the handles are fastened to the frame by the clamps J, which consist each of a U-shaped clip $q$ and a yoke $r$. Preferably the butt-ends of the handles bear against the outer faces of the upright cutters D and are constructed with offsets or sockets $s$ embracing these cutters, and the clamps J draw the handles and frame together against the upper ends of the cutters. In this arrangement the clips $q$ pass diagonally across the frame and their free ends project the one above the frame and in front of the upright cutter, and the other below the frame and at rear of such cutter. This method of fastening gives a sufficiently rigid connection between the handle and frame and permits the removal or adjustment of the handle at will.

The side cutters or shares D may be any suitably-formed upright blade or cutting-edge extending from the depth at which the cut of the transverse blade F is made upwardly toward the top of the frame. Preferably they are substantially-vertical blades and are fastened at their lower ends pivotally by a rivet or other suitable provision $n$ between the inner lower faces of the legs $f$ of the frame within the slots of points E, and rise thence upwardly, passing against and above the outer faces of the sides $e$ of the frame, and have knife edges at front from their lower ends up to the upper part of the frame, and are of uniform thickness throughout at their upper ends. Preferably they are fastened at their upper ends against the frame by the clamps J, which also secure the handle C, the blades D passing between the handles and the frame, and held in this position when the clamps are tightened up.

I prefer to provide the penetrating points, feet, or shares E at the bottom of the legs $f$. In the construction shown, these have forwardly-projecting points which penetrate the earth in advance of the upright cutters, and rearwardly-extending slotted bodies, substantially horizontal, which embrace and are secured near their middles to the cutters D and the legs $f$ in any suitable manner, and project at rear of these legs, where they carry studs $t$. Any suitable connection between the points and the legs will suffice, but I prefer to use the rivet $n$, which fastens the corresponding upright cutter, and an auxiliary rivet $u$, at rear thereof, for fastening the point to the leg in each instance.

My invention also comprises a transverse share or cutter F, which, while it is adjustable to be tilted out of the horizonal for graduating the depth of cut or the operation of the machine, is, according to the main feature of this invention, normally freely movable relatively to the frame and upright cutters in use to permit it to automatically adjust itself to the best position for effecting a cut through any obstacle. This preferably is a flat blade having a knife edge at front, a wide body, and secured at rear of the upright cutters D. The connection between the share F and the frame is best made a pivotal connection, and in the construction shown is accomplished by providing the blade with an eye N, which is immediately at rear of the leg $f$ and engages its stud $t$ carried by the corresponding point E, so that the blade can be swung on this connection to any desired inclination. The blade preferably projects laterally at its ends some distance beyond the upright cutters. The pivotal connection between the blade and frame is thus at or in advance of, and substantially in the plane of, the cutting edge of the blade, so that the blade is drawn forwardly as a dragging or trailing member, which, when its edge strikes any obstacle, can swing or tilt on its loose connection with the frame until there is a direct line between the edge of the blade through the axis of its pivotal connection to the point at which force is applied to the frame. Hence the apparatus, when an obstacle of great resistance is encountered, immediately adapts itself with the minimum of bodily shifting to the position for best applying all the force exerted on it to the edge of the blade, to the end that the latter will go directly through anything this force is capable of penetrating with it.

One or more suitable handles G are provided for controlling or operating the transverse cutter. Two are shown, which consist of slender yielding upright bars fastened against the inner sides of and above the handles C at their upper ends, and at their lower ends bent forwardly and then on themselves to form the eyes N, embracing at their bent ends the top and bottom faces of the transverse cutter and secured thereto by any suitable provision, as the rivets $v$, passing through the cutter and both the upper and lower portions of the bent ends of the handles. If it is desired to lock the handles in any particular position, this may be provided for by a suitable lock, as, for example, the lock H, which has a toothed rack formed on the inturned edge of each handle C. The handles G may be moved into any of the notches in this rack until their desired position is obtained, whereby they will be retained in position by the next rearward tooth of the rack. The tilting of the blade in cutting objects is permitted by the upward and downward sliding of the handles in these notches, or by their yielding in any other suitable manner when they are employed.

In operation the implement is dragged along by horses and guided by the handles C which are grasped by the operator. To vertically adjust the grubber its transverse blade may be inclined with the edge downwardly and the points pressed toward the ground, thus giving a double tendency to force the implement downward. When the desired depression is reached the transverse blade may be adjusted with an inclination such as will tend to maintain the implement at this depression, the adjustment being maintained by the lock H for the handles G. As the implement moves through the ground, the upright cutters D make a cut or opening in advance of the legs $f$ and the handles G, these parts being all substantially in alignment, so that the resistance to forward movement is comparatively small. The points E project forward in the earth and serve to guide and steady the implement in its progress. The transverse cutter severs or tears through every stub or root in its path between the upright cutters. When it is desired to stir the soil, as well as cut the stubs and roots, the transverse cutter may be given a more or less upward inclination at its rear edge, whereby it will lift the soil after the cutting operation as it passes, and in depositing it again from its rear edge will effect a considerable agitation or displacement of the soil.

It will be understood that my invention provides an improved agricultural implement which can be advantageously used as a grubber, grubbing-machine, or analogous implement for the purposes for which such devices are now employed, and it will be understood that the invention is not limited to the particular features of construction and arrangement hereinbefore set forth as constituting its preferred form, as it may be adapted according to such other details of construction or arrangement as circumstances or the judgment of those skilled in the art may dictate without departing from the essential features of the invention.

The grubber is in practice found especially advantageous for grubbing mesquite-grubs, brush, and the like that cover the prairies. In this work in actual practice the horizontal blade is found under all circumstances to automatically adjust itself to cut the heavy roots or stumps, cutting from the smallest up to those of ten or twelve inches in diameter or larger by turning its edge to the stump as soon as it begins to press the latter, and thus throwing itself in line with the draft or course of its travel. For such heavy work the machine is pulled by a steel-cable from a capstan, using one or two horses at the latter, by which means a power of from fifty to several hundred horse-power may be obtained.

What I claim is, in grubbers and analogous implements, the following-defined novel features and combinations, substantially as hereinbefore set forth, namely:

1. In a grubber and analogous device, a frame, and a transverse blade carried thereby, pivotally connected thereto, and adjustable and freely movable toward and from the horizontal on its pivotal connection therewith.

2. In grubbers and analogous implements, a frame, having downwardly extended legs, two upright cutters carried thereby, pivotally connected at their lower ends to said legs and adjustably connected at their upper parts to said frame, forwardly projecting points at the lower ends of said cutters, and a transverse cutter between said upright cutters.

3. In grubbers and analogous implements, a frame, and upright and transverse cutters carried thereby, said transverse cutter pivotally connected to said frame, and separate handles for said frame and transverse cutter.

4. In grubbers and analogous implements, the frame, in combination with upright cutters, and a transverse cutter carried thereby and movable independently thereof, and separate handles for said frame and said transverse cutter.

5. In grubbers and analogous implements, the frame A having penetrating legs $f$, points E at the extremities of said legs, and tilting transverse blade F between said legs, and a pivotal connection between said legs and blade in advance of and in substantially the same plane as the edge of the cutter.

6. In grubbers and analogous implements, the frame A having penetrating legs $f$, in combination with points E at the extremities of said legs having slotted bodies receiving the ends of the latter, upright cutters D in front of said legs, entering at their lower ends the bodies of said points, and a transverse cutter extending between said legs.

7. In a grubber or analogous implement, a frame, a substantially horizontal blade having a cutting edge at front, and a pivotal connection between said frame and blade permitting movement of the latter relatively to the former, said connection having a substantially horizontal axis at front of and substantially in the horizontal plane of the cutting edge of said blade.

8. In grubbers and analogous implements, a frame, in combination with a substantially horizontal blade having a forward cutting edge, a pivotal connection between said blade and frame having a substantially horizontal axis at front of said edge and in substantially the same horizontal plane as the latter, and handles for said blade and frame respectively, substantially as and for the purpose set forth.

9. In grubbers and analogous implements, the combination with a substantially horizontal blade, of a frame A connected thereto for moving it, and consisting of a U-shaped bar $d$ having substantially parallel side parts $e$, an intermediate transverse part K constituting a brace, and downturned legs $f$ connected to the said blade, and an angular front bar $a$ bent on itself at $b$ and having ends $c$ embracing and fixed to the sides $e$ of said bar $d$, and a brace L between said sides $e$ at rear of said brace K, substantially as and for the purpose set forth.

In witness whereof I have hereunto signed my name in the presence of two subscribing witnesses.

GEO. W. CAMERON.

Witnesses:
FRANK. RUMLEY,
W. L. HAMILTON.